United States Patent Office 3,098,063
Patented July 16, 1963

3,098,063
WATER-SOLUBLE MONOAZO DYESTUFFS
Julius Eisele, Ludwigshafen (Rhine), Wilhelm Federkiel, Frankenthal (Pfalz), Guenter Krehbiel, Ludwigshafen (Rhine), Hans Krzikalla, Heidelberg, and Guenter Lange and Heinz Pohlemann, Ludwigshafen (Rhine), Germany, assignors to Badische Anilin- & Soda-Fabrik Aktiengesellschaft, Ludwigshafen (Rhine), Germany
No Drawing. Filed Feb. 23, 1960, Ser. No. 10,078
Claims priority, application Germany Dec. 13, 1957
8 Claims. (Cl. 260—163)

This invention relates to water-soluble monoazo dyestuffs which contain at least one water-solubilizing group and which are free from sulfonic acid groups in the part of the molecule corresponding to the diazo component, but contain in the said part of the molecule at least once, combined by way of an imino group, the group of the general formula:

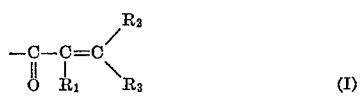

(I)

in which each of the radicals R stands for a monovalent radical selected from the group consisting of a hydrogen atom, an alkyl group and a halogen atom, and to a process for the production of dyestuffs of the said kind.

A special object of this invention are water-soluble monoazo dyestuffs of the above-mentioned kind which are free from sulfonic acid groups in the part of the molecule corresponding to the diazo component, but contain in the said part of the molecule at least once, combined by way of an imino group, the group of the general formula:

(II)

in which one of the radicals $R_1$ and $R_2$ stands for a hydrogen atom and the other radical stands for a halogen atom, and a process for the production of such dyestuffs.

This application is a continuation-in-part of our copending application Serial No. 779,809, filed December 12, 1958, now abandoned.

As water-solubilizing groups there may be used above all sulfonic acid groups, but carboxyl groups, sulfonic acid amide groups, alkylsulfone groups and alcoholic hydroxyl groups are also suitable. The halogen atoms may be for example chlorine or bromine atoms. As alkyl groups there may be mentioned for example low molecular weight alkyl groups, such as methyl, ethyl or isopropyl groups.

We have found that new valuable dyestuffs are obtained when acylating agents which contain the radical of the general formula:

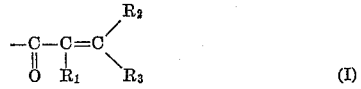

(I)

in which the radicals $R_1$, $R_2$ and $R_3$ have the meanings given above, are reacted with monoazo dyestuffs which have at least one water-solubilizing group and at least in the part of the molecule corresponding to the diazo component an acylatable amino group, but no sulfonic acid groups, or their coupling and/or diazo components which may or may not contain corresponding groups, to form acrylic acid amide derivatives which may or may not be substituted and, in the case when the said preliminary products are used, the azo dyestuff is completed in known manner by coupling or by diazotization and coupling.

It is advantageous to react acylating agents which contain the radical of the general formula:

(II)

in which the radicals $R_1$ and $R_2$ have the meanings given above, with monoazo dyestuffs which have at least one water-solubilizing group and at least in the part of the molecule corresponding to the diazo component an acylatable amino group, but no sulfonic acid groups, or their coupling and/or diazo components which may or may not contain corresponding groups, to form substituted acrylic acid amide derivatives and, in the case when the said preliminary products are used, the azo dyestuff is completed in known manner by coupling or by diazotization and coupling.

Preferred acylatable amino groups are primary amino groups, but secondary amino groups are also suitable.

Dyestuffs obtainable according to this process are for example monoazo dyestuffs, such as water-soluble azo dyestuffs of the general formula:

$$A—N=N—D \qquad (III)$$

which contain up to twice, combined by way of an imino group, the group of the general formula:

(I)

in which the radicals $R_1$, $R_2$ and $R_3$ have the meanings given above, and up to four water-solubilizing groups. The radical A in Formula III does not contain sulfonic acid groups, but contains at least once, combined by way of an imino group, the group of the general formula:

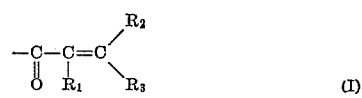

(I)

in which the radicals $R_1$, $R_2$ and $R_3$ have the meanings given above. In Formula III A represents an aromatic radical of the benzene series containing up to two benzene nuclei and up to three monovalent radicals, and D represents a radical selected from the group consisting of heterocyclic radicals which may have up to three monovalent radicals, and aromatic radicals with up to two benzene nuclei which in turn may have up to four monovalent groups.

The dyestuffs in which the group of the general Formula I stands for the group of acrylic acid:

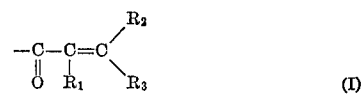

(IV)

are of great technical interest.

Water-soluble monoazo dyestuffs of the above-mentioned kind are especially valuable which have the general formula:

$$A—N=N—D \qquad (III)$$

in which A and D have the meanings given above and the radical A does not contain sulfonic acid groups but contains at least once, combined by way of an imino group, the group of the general formula:

(II)

in which $R_1$ and $R_2$ have the meanings given above.

Preferred water-solubilizing groups are sulfonic acid groups —$SO_3^\ominus$ and carboxyl groups —$COO^\ominus$ (in the form of the free acids or salts, especially the alkali salts, for example the sodium or potassium salts, or also the ammonium salts). Sulfonic acid amide groups, for example —$SO_2.NH_2$, or alkylsulfone groups, for example low-molecular weight alkylsulfone groups, such as —$SO_2.CH_3$ or —$SO_2.C_2H_5$, are, however, also well suited as water-solubilizing groups.

As monovalent radicals in the aromatic radicals A, for example in benzene, diphenylsulfide, diphenylsulfone, diphenylmethane or diphenylamine radicals, there are suitable, besides the groups of the general Formula I (in which $R_1$, $R_2$ and $R_3$ have the meanings given above) combined by way of an imino group, alkyl groups, for example low-molecular weight alkyl groups, such as methyl or ethyl groups, alkoxy groups, for example low-molecular weight alkoxyl groups, such as methoxyl or ethoxyl groups, nitro groups, halogen atoms, such as chlorine or bromine atoms, and/or hydrogen atoms.

The heterocyclic radicals D, for example pyrazolone radicals, advantageously contain as monovalent radicals, besides at least one enolic hydroxyl group, the groups

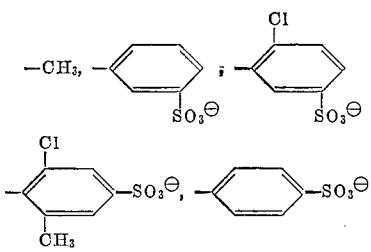

and/or hydrogen atoms.

It is preferred that the aromatic radicals D, for example benzene or naphthalene radicals, should bear as monovalent radicals, besides at most one phenolic or enolic hydroxyl group or primary aromatic amino group, above all water-solubilizing groups of the above-mentioned kind. As monovalent radicals for this purpose there are also suitable, however, groups of the general formula

 (I)

(in which $R_1$, $R_2$ and $R_3$ have the meanings given above), combined by way of an imino group, and also acylated amino groups, for example benzoylated or acetylated amino groups, alkyl groups, for example low-molecular weight alkyl groups, such as methyl or ethyl groups, and/or hydrogen atoms.

For the production of the new monoazo dyestuffs there may be used either diazo components which contain at least once, combined by way of an imino group, the group of the general Formula I (in which $R_1$, $R_2$ and $R_3$ have the meanings given above) but no sulfonic acid group, and wherein one or more water-solubilizing groups are contained in the diazo components and/or in the coupling components, or azo dyestuffs are prepared which contain in the part of the molecule corresponding to the diazo component, besides one or more water-solubilizing groups, one or more acylatable primary or secondary amino groups but no sulfonic acid groups, and into which there is subsequently introduced once or more than once the group of the general Formula I, in which $R_1$, $R_2$ and $R_3$ have the meanings given above.

The introduction of the said radical into diazo components, coupling components or azo dyestuffs which contain one or more acylatable primary or secondary amino groups is effected by known methods, for example by reaction of the amino compound with the halides, anhydrides or esters of alpha, beta-unsaturated carboxylic acids or with internal anhydrides of alpha, beta-unsaturated dicarboxylic acids, such as acrylic acid chloride or bromide, acrylic acid anhydride, alpha-methacrylic acid chloride, beta, beta-dimethylacrylic acid chloride, alpha-chloracrylic acid esters or beta-chloracrylic acid chloride. The acylation with acrylic acid chloride is of special technical interest.

The reaction of the diazo components, coupling components or azo dyestuffs which contain amino groups with aliphatic alpha-beta-unsaturated carboxylic acid halides or anhydrides of the above-mentioned kind may proceed at temperatures between —10° C. and +50° C. It is preferable to choose temperatures between 0° and +35° C. The above-mentioned dyestuff intermediates or dyestuffs may be acylated with agents which introduce the radical of the general Formula I in which $R_1$, $R_2$ and $R_3$ have the meanings given above, preferably in solution, for example in water or in aqueous alcoholic solution, or if necessary to the aqueous or aqueous-alcoholic solutions of the above-mentioned dyestuff intermediates or azo dyestuffs, prior to the acylation, there may be added water-miscible solvents or diluents which do not react with the above-mentioned alpha,beta-unsaturated carboxylic acids, as for example low-molecular weight ketones, such as acetone, or carboxylic acid amides, such as N,N-dimethylformamide, N,N-dimethylacetamide or N-methylpyrrolidone.

As diazo components which have an alpha,beta-unsaturated acylamino group there may be mentioned for example: 1-amino-3(or 4-)-acryloylaminobenzene, 1-amino-3(or 4)-(alpha-methylacryloyl)-aminobenzene, 1-amino-3(or 4)-(beta,beta-dimethylacryloyl)-aminobenzene and their derivatives having halogen atoms, alkoxyl groups, alkyl groups, nitro groups, sulfonic acid amide groups, alkylsulfone, aralkylsulfone or arylsulfone groups on the benzene nucleus. Diazo components which contain one or more, possibly substituted, acryloylamino groups connected to the actual diazo component by way of a benzene nucleus, i.e. for example compounds of the formula:

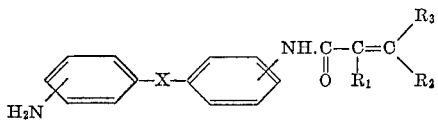

in which X represents a direct linkage or

—$CH_2$—, —S—, —$SO_2$— or —NH— are also well suited for the preparation of the new dyestuffs.

However, those diazo components with at least one alpha,beta-unsaturated acrylamino group which are free from sulfonic acid groups are necessary as diazo components for the process according to this invention. These components may be prepared by treating aromatic nitro-amino compounds, for example of the benzene, diphenylsulfide, diphenylsulfone, diphenylmethane or diphenylamine series, which may also contain alkyl, alkoxyl, sulfonic acid amide or alkylsulfone groups and/or halogen atoms as substituents, with acylating agents capable of introducing the group of the general formula:

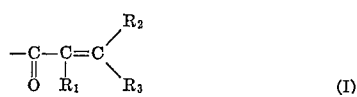 (I)

in which $R_1$, $R_2$ and $R_3$ have the meanings given above. Then the nitro group is converted into an amino group by partial reduction with a reducing agent which preserves the alpha,beta-unsaturated linkage of the acrylic radical, for example a mixture of calcium chloride and metallic iron (preferably in the form of turnings) in water. The reduction may be carried out at temperatures between 80° and 120° C., preferably at 100° C., if necessary in the presence of a solvent, for example propanol, butanol or concentrated acetic acid.

Suitable coupling components are all systems capable of coupling provided one or more water-solubilizing groups are contained in the diazo component and/or in the coupling component. Such compounds capable of coupling include benzene and naphthalene derivatives and heterocyclic compounds which contain one or more radicals of alpha,beta-unsaturated carboxylic acids combined by way of imino groups, as for example 1-hydroxy-2,3- or -4-acryloylaminobenzene, acryloylaminohydroxynaphthalenes and their sulfonic acids, such as 1-acryloylamino- 8-hydroxynaphthalene-3,6-disulfonic acid, 1 - (acryloyl-amino)-phenyl-3-methyl-pyrazolone-(5) and the like.

If it is desired to introduce the possibly substituted acrylic acid amide group into the previously formed dyestuff, then all azo dyestuffs are suitable which contain in the part of the molecule corresponding to the diazo component, besides a sufficient number of water-solubilizing groups, at least one acylatable primary or secondary amino group, but no sulfonic acid groups. For this purpose, for example, dyestuffs containing nitro groups may also be reduced by methods known per se to the corresponding dyestuffs containing amino groups and these then converted into the corresponding amides of alpha,beta-unsaturated carboxylic acids.

It is advantageous to use acylating agents which are capable of introducing the group of the general formula:

(II)

in which $R_1$ and $R_2$ have the meanings given above, for the reaction with those azo dyestuffs which contain in the part of the molecule corresponding to the diazo component at least one acylatable amino group or one or more radicals convertible in known manner into such a primary or secondary amino group, but no sulfonic acid groups.

The new dyestuffs are suitable for dyeing and printing structures, for example foils, films, or textile materials, such as fibers, threads, flocks, woven and knitted fabrics, of natural and/or synthetic materials containing carboxylic acid amide groups, such as wool, natural silk, linear polyamides, linear polyurethanes and leather. They are distinguished from analogously constituted dyestuffs which contain saturated acylamino groups instead of the possibly substituted acrylic acid amide groups, by considerably better wet fastness properties. Brilliant dyeings and prints of excellent fastness to light are obtained with dyestuffs according to this invention.

The new dyestuffs are of special technical interest because dyeings and prints which have very good fastness to light, moisture and rubbing can be produced on structures of cellulose such as films, foils, and textile materials, for example fibers, threads, flocks, woven and knitted fabrics of natural and/or regenerated cellulose by using the dyestuffs according to the invention, treating the structures at any time during the process with alkaline agents and if necessary heating for a short time at temperatures between 70° and 150° C.

The statement that the structures of cellulose are treated at any point in time during the process with alkaline agents, for example alkali or alkaline earth hydroxides, carbonates or bicarbonates, such as sodium hydroxide, potassium hydroxide, calcium hydroxide, potassium carbonate or sodium bicarbonate, means that it is immaterial whether the structures are treated with the alkaline agents before, during or after the dyeing or printing.

The expression "short time" as used in this specification is intended to include a duration of preferably 30 seconds to 6 minutes, but also of 10 seconds to 30 minutes.

The dyeing process may be carried out for example by padding the cellulose with a solution of the dyestuff and leading it, preferably after drying, through a bath which contains an alkaline agent, for example advantageously sodium hydroxide, carbonate or bicarbonate, potassium hydroxide or carbonate, but also a secondary or tertiary alkali phosphate, such as disodium phosphate and trisodium phosphate, whereupon the dyestuff is fixed on the fiber by steaming. The alkaline agent may however be added to the padding bath. Furthermore it is possible to dye with dyestuffs with the addition of alkaline agents and if necessary electrolytes at 20° to 30° C. and to fix the dyestuffs by gradually raising the bath temperature. Finally, the cellulose may also be pretreated with a solution of an alkaline agent, dried, dyed with a dyestuff of the said kind and then steamed. Instead of by steaming, the fixation may also be effected with hot air at a temperature up to 200° C.

While the dyeing process is especially well suited to the production of dyed textile materials, such as fibers, threads, flocks and fabrics of cotton, it is applicable quite generally to textile materials both of natural and regenerated cellulose.

In printing, the dyestuff is preferably applied to the fiber together with a thickening agent, such as sodium alginate or tragacanth, if desired with one of the usual printing auxiliaries and an alkaline agent, dried and steamed. The fabric may also be printed with the dyestuff together with a thickening agent and the usual printing auxiliaries, dried, led through a bath charged with an alkaline agent, dried and then steamed.

In dyeing and/or printing, the dyestuffs are fixed on the cellulose at temperatures between 40° and 200° C. It is advantageous to choose the range of 70° to 150° C., and a treatment with steam at these temperatures produces especially good results. The dyeings and prints thus obtained have very good fastness to wet treatment, rubbing and light.

Those of the new dyestuffs which contain the radical of the formula

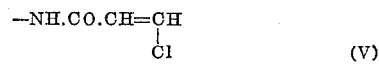
(V)

are especially valuable, because they can be fixed on structures of cellulose at considerably lower temperatures than the corresponding dyestuffs incorporating the radical of the formula

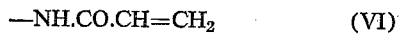
(VI)

instead of the radical of Formula V. This feature is most advantageous in the continuous dyeing of structures of cellulose using the new dyestuffs.

The following examples will further illustrate this invention but the invention is not restricted to these examples. The parts specified in the examples are parts by weight.

*Example 1*

16.2 parts of 1-amino-4-acryloylaminobenzene are dissolved in 100 parts of water and 25 parts of hydrochloric acid ($d$=1.15). After adding 100 parts of ice, the mixture is diazotized by slow addition of a solution of 6.9 parts of sodium nitrite in 20 parts of water. The solution of the diazo compound is stirred for a further half hour and then allowed to flow at 5° to 10° C. into a solution of 22.4 parts of 2-hydroxynaphthalene-6-sulfonic acid, 4 parts of sodium hydroxide and 16 parts of sodium carbonate in 300 parts of water. The coupling is ended after 2 to 3 hours. The dyestuff is completely deposited by adding sodium chloride, filtered off by suction and dried in vacuo at 40° C. The brown-red dyestuff powder obtained, which dissolves in water with a deep red color, dyes wool very fast and level brilliant red shades from a weak acid bath.

If 25.4 parts of 1-(phenyl-3-sulfonic acid)-3-methyl-pyrazolone-(5) be used instead of 2-hydroxynaphthalene-6-sulfonic acid as coupling component and the above procedure be followed, a dyestuff is obtained which dyes wool a deep orange-yellow color which is very fast and level.

*Example 2*

19 parts of 1-amino-4-(beta,beta-dimethylacryloyl)-aminobenzene are diazotized in the manner described for 1-amino-4-acryloylaminobenzene in Example 1, and the diazo solution is allowed to flow at 5° to 10° C. into a solution of 30.4 parts of 2-hydroxynaphthalene-3,6-disulfonic acid, 8 parts of sodium hydroxide and 16 parts of sodium carbonate in 320 parts of water. After 4 hours, the dyestuff is deposited by the addition of sodium chloride. It is filtered off by suction and dried at 40° C. in vacuo. It dyes wool fast and level brilliant carmine red shades.

Example 3

19.7 parts of 1-amino-4-(beta-chloracryloyl)-aminobenzene are dissolved in 150 parts of water and 25 parts of hydrochloric acid ($d=1.15$) and diazotized at 0° to +5° C. by adding a solution of 6.9 parts of sodium nitrite in 20 parts of water. A solution of 42.3 parts of N-benzoyl-1-amino-8-hydroxynaphthalene-4,6-disulfonic acid, 8 parts of sodium hydroxide and 16 parts of sodium carbonate in 400 parts of water is stirred in. The coupling is ended after 4 hours. The dyestuff is deposited by the addition of sodium chloride. It is filtered off by suction and dried at 40° C. in vacuo. The violet-black dyestuff powder obtained dissolves in water with a violet color and dyes wool deep blue-violet shades.

Example 4

Cotton fabric is padded with a solution which contains per liter 15 grams of the dyestuff described in Example 3. The fabric is then squeezed to 90% moisture content, dried, led through a second padding bath which contains per liter 15 grams of sodium hydroxide and 200 grams of sodium chloride, squeezed, steamed for 1 minute at 105° C. and soaped at the boil. Dyeings in violet shades are obtained of which the wet fastness properties, fastness to rubbing and fastness to light are very good.

Example 5

Staple fiber fabric is padded with a solution which contains per liter 20 grams of the dyestuff described in Example 1, paragraph 1, 10 grams of sodium sulfate and 10 cc. of aqueous sodium hydroxide solution of 38° Baumé strength, dried and treated for 3 minutes with hot air at 140° C. It is then soaped at the boil. Red dyeings are obtained with very good wet fastness properties, very good fastness to rubbing and good fastness to light.

Example 6

Cotton fabric is printed with a paste which contains per kilogram 30 grams of the dyestuff described in Example 3, 120 grams of urea, 388 grams of water, 410 grams of sodium alginate thickening (40/1000), 45 grams of sodium carbonate and 7 grams of aqueous sodium hydroxide solution of 38° Baumé strength. The fabric is then dried and steamed for 5 minutes in a Mather-Platt steamer. Violet prints are obtained which are very fast to light, moisture and rubbing.

Example 7

16.2 parts of 4-acryloylamino-1-aminobenzene are dissolved in 100 parts of water with the addition of 25 parts of concentrated hydrochloric acid. After adding 100 parts of ice, diazotization is effected by adding an aqueous solution of 6.9 parts of sodium nitrite. The clear diazonium solution is allowed to flow into a solution of 38.3 parts of 1-acryloylamino-8-hydroxynaphthalene-4,6-disulfonic acid, 12 parts of sodium hydroxide and 5.3 parts of anhydrous sodium carbonate in 100 parts of water. After stirring for 12 hours, the dyestuff formed is deposited by adding 100 parts of sodium chloride, filtered off by suction and dried in vacuo at 40° C. It dyes wool clear violet shades having very good wet fastness properties.

Example 8

The monazo dyestuff prepared in the usual way by diazotization of 15 parts of 1-amino-4-acetylaminobenzene and coupling of the diazonium salt with 30.4 parts of 2-hydroxynaphthalene-3,6-disulfonic acid is deacylated by treatment for one hour with boiling 2 N sulfuric acid. The compound thus obtained together with 30 parts of sodium bicarbonate is dissolved in a mixture of 300 parts of water and 100 parts of acetone. Into this solution, 15 parts of alpha-methylacrylic acid chloride are introduced in small portions at 0° to +5° C. during the course of an hour. The reaction mixture is thereafter stirred for another half an hour and the dyestuff completely deposited by adding sodium chloride. The dyestuff is then filtered off by suction and dried in vacuo at 50° C. It dyes wool very fast and level red shades.

Instead of alpha-methylacrylic acid chloride, the corresponding amount (21.4 parts) of alpha-methylacrylic acid bromide may be used.

Example 9

15 parts of 1-amino-4-acetylaminobenzene are diazotized and coupled with 30.4 parts of 2-hydroxynaphthalene - 6,8 - disulfonic acid. The monazo dyestuff formed is deacylated as described in the preceding example. The compound thus obtained is dissolved together with 30 parts of sodium bicarbonate in a mixture of 300 parts of water and 100 parts of acetone. Into this solution there are introduced within half an hour at 0° to +5° C. 19 parts of beta-chloracrylic acid chloride, the reaction mixture is stirred for another hour and the dyestuff formed then separated off and dried at 50° C. in vacuo. The dyestuff, which has very good solubility, yields clear and very fast red dyeings.

By using 32.5 parts of beta-bromacrylic acid bromide instead of beta-chloracrylic acid chloride a similar dyestuff is obtained.

Example 10

12.5 parts of 1-amino-4-alpha-chloracryloylaminobenzene are finely dispersed in a mixture of 100 parts of water and 25 parts of aqueous hydrochloric acid ($d=1.15$). After adding 100 parts of ice, diazotization is effected by slow addition of a solution of 6.9 parts of sodium nitrite in 20 parts of water. After the solution of the diazonium compound has been stirred for an hour, it is allowed to flow at 5° to 10° C. into a solution of 22.3 parts of 2-hydroxynaphthalene-6-sulfonic acid amide, 4 parts of sodium hydroxide and 16 parts of sodium carbonate in 320 parts of water. The coupling is ended after 2 hours. The dyestuff is then completely deposited by adding sodium chloride, filtered off by suction and dried at 50° C. in vacuo. It dyes wool bluish red shades which are fast and very level.

Example 11

19.7 parts of 1-amino-2-chlor-4-acryloylaminobenzene are dissolved in a mixture of 100 parts of water and 25 parts of hydrochloric acid ($d=1.15$). After adding 100 parts of ice, diazotization is carried out by slow addition of a solution of 6.9 parts of sodium nitrite in 20 parts of water. The solution of the diazonium compound is stirred for another half an hour and then allowed to flow very slowly while stirring at 5° to 10° C. into a solution of 23.9 parts of 2-amino-8-hydroxynaphthalene-6-sulfonic acid and 4 parts of sodium hydroxide in 300 parts of water to which aqueous hydrochloric acid has previously been added in such an amount that the solution reacts slightly acid to Congo red. By simultaneous addition of dilute aqueous sodium acetate solution the pH value of the reaction mixture is kept at 3 to 4. After 12 hours, the coupling is ended. The dyestuff formed is then deposited by addition of sodium chloride, filtered off by suction and dried at 40° C. in vacuo. It dyes wool very fast Bordeaux red shades.

By using the equivalent amount of 1-amino-2-brom-4-acryloylaminobenzene instead of 1-amino-2-chlor-4-acryloylaminobenzene and proceeding in the above-described manner, a valuable Bordeaux red dyestuff is obtained.

Example 12

19.2 parts of 1-amino-3-acryloylamino-6-methoxybenzene are dissolved in 100 parts of water and 25 parts of hydrochloric acid ($d=1.15$). After adding 100 parts of ice, diazotization is carried out by slow addition of a solution of 6.9 parts of sodium nitrite in 20 parts of water. The solution of the diazo compound is stirred for another half an hour and then a solution of 28.9 parts of 1-(2-chlorphenyl-5-sulfonic-acid)-3-methylpyrazolone-(5), 4 parts of sodium hydroxide and 16 parts of sodium carbonate in 320 parts of water is allowed to flow in at 3° to 6° C. The coupling is ended after 2 to 3 hours. The dyestuff is completely precipitated by adding sodium chloride, filtered off by suction and dried at 40° C. in vacuo. The yellow-brown dyestuff powder obtained dyes wool very fast brilliant yellow shades from a weak acid bath.

By using 36.1 parts of 1-acetylamino-8-hydroxynaphthalene-3,6-disulfonic acid as coupling component instead of 1-(2-chlorphenyl-5-sulfonic-acid)-3-methylpyrazolone-(5), and following the procedure described above, a dyestuff is obtained which dyes wool very fast and level deep red-violet shades.

The following dyestuffs are obtained in a similar way:

| Diazo components | Coupling components | Color |
|---|---|---|
| $H_3CO$–[benzene, $NH_2$]–$NHCOCH=CH_2$ | $HO$–[pyrazole, $CH_3$]–N–[phenyl, $Cl$, $CH_3$, $SO_3H$] | Yellow. |
| $H_3CO$–[benzene, $NH_2$]–$NHCOCH=CH_2$ | $HO_3S$–[naphthalene]–$OH$ | Red. |
| $H_3CO$–[benzene, $NH_2$, $OCH_3$]–$NHCOCH=CH_2$ | [naphthalene, $OH$, $SO_3H$] | Violet. |
| [phenyl, $NH_2$]–S–[phenyl]–$NHCOCH=CH_2$ | $HO$–[pyrazole, $CH_3$]–N–[phenyl, $SO_3H$] | Yellow. |
| [phenyl, $NH_2$]–$O_2S$–[phenyl]–$NHCOCH=CH_2$ | [naphthalene, $OH$, $SO_3H$] | Bluish red. |
| [phenyl, $NH_2$]–$O_2S$–[phenyl]–$NHCOCH=CH_2$ | $HO_3S$–[naphthalene]–$OH$ | Do. |

| Diazo components | Coupling components | Color |
|---|---|---|
| ![structure: 4-amino-3'-methyl-4'-acryloylamino-biphenyl type: NH2-C6H4-C6H3(CH3)-NHCOCH=CH2] | ![structure: 1-(3-sulfophenyl)-3-methyl-5-hydroxypyrazole] | Orange yellow. |
| ![structure: 4-amino-4'-acryloylamino-diphenylamine: NH2-C6H4-NH-C6H4-NHCOCH=CH2] | ![structure: 2-hydroxy-3,6-disulfonaphthalene (HO3S—naphthalene—OH with SO3H)] | Violet red. |
| ![structure: 4-amino-α-acryloylaminomethylbenzene: NH2-C6H4-CH2-NHCOCH=CH2] | ![structure: 1-hydroxy-naphthalene-4-sulfonic acid] | Red. |

Example 13

16.2 parts of 1-amino-3-acryloylaminobenzene are diazotized as described for 1-amino-4-acryloylaminobenzene in Example 1, and the diazo solution is allowed to flow at 5° to 10° C. into a solution of 25.4 parts of 1-(phenyl-3-sulfonic acid)-3-methylpyrazolone-(5), 4 parts of sodium hydroxide and 16 parts of sodium carbonate in 320 parts of water. After 2 to 3 hours, the dyestuff is precipitated by gradual addition of sodium chloride. It is filtered off by suction and dried in vacuo at 40° C. It dyes wool fast and level brilliant yellow shades.

For the production of 1-amino-3-acryloylaminobenzene as used in the first paragraph, 9.2 parts of acrylic acid chloride are stirred in small portions into a solution of 13.8 parts of 1-amino-3-nitrobenzene in 25 parts of N-methyl-pyrrolidone, the mixture being heated to 50 to 55° C. The mixture is stirred for another hour at this temperature and then poured into 200 parts of water. The reaction product which deposits is filtered off by suction, washed with water and dried at 50° C. under reduced pressure. There are thus obtained 19 parts of 1-acryloylamino-3-nitrobenzene of the melting point 212 to 214° C. For the purposes of paragraph 3 the undried product may be used.

To a solution of 16 parts of sodium in 200 parts of water at 90° C. there are added 40 parts of iron filings and then 19 parts of 1-acryloylamino-4-nitrobenzene are introduced with powerful stirring in such a way that the temperature of the mixture remains at 90 to 95° C. without supply of heat. Stirring is continued for another half an hour at 90 to 95° C., the hot reaction mixture filtered and the filtrate cooled as rapidly as possible. The filtrate is then adjusted to pH 1 by adding dilute aqueous hydrochloric acid and 50 parts of sodium chloride are stirred into the solution. As soon as the reaction material has separated it is filtered off by suction and dried at 50° C. under reduced pressure. There are obtained 18 parts of very pure 1-acryloylamino-3-aminobenzene in the form of the hydrochloride.

Example 14

16.2 parts of 1-amino-4-acryloylaminobenzene are diazotized as in Example 1 and the diazo solution is allowed to flow at 3° to 5° C. into a solution of 22.4 parts of 1-hydroxynaphthalene-5-sulfonic acid, 4 parts of sodium hydroxide and 16 parts of sodium carbonate in 320 parts of water. After an hour, the dyestuff formed is completely precipitated by adding sodium chloride. It is filtered off by suction and dried at 50° C. in vacuo. The brown-red powder dyes wool very fast and level carmine red shades.

For the production of 1-amino-4-acryloylaminobenzene as used in the first paragraph, a mixture of 15 parts of acrylic anhydride and 20 parts of acetone is stirred in small portions at 0 to +5° C. into a mixture of 13.8 parts of 1-amino-4-nitrobenzene, 70 parts of acetone and 20 parts of water while maintaining the pH of the reaction mixture at 6 by slow addition of aqueous sodium bicarbonate solution. Stirring is continued for another hour and the temperature is allowed to rise slowly to 20° C. The mixture is then introduced into 200 parts of water. The reaction material which separates is filtered off by suction, washed with water and dried at 50° C. under reduced pressure. There are obtained 16 parts of 1-acryloylamino-4-nitrobenzene of the melting point 230 to 231° C. The reduction of the nitro compound to the amino compound is carried out in the manner described in paragraph 3 of Example 13. The 1-acryloylamino-4-aminobenzene is thus obtained in good yield in the form of the hydrochloride.

The invention set forth above relates to water-soluble monoazo dyestuffs which contain at least one water-solubilizing group and which are free from sulfonic acid groups in the part of the molecule corresponding to the diazo component, but contain in the said part of the molecule at least once, combined by way of an imino group, the group of the general formula

in which the radicals $R_1$, $R_2$ and $R_3$ have the meanings given above. In particular, the invention relates to water-soluble dyestuffs of the said kind which are free from sulfonic acid groups in the part of the molecule corresponding to the diazo component but contain in the said part of the molecule at least once, combined by way of an imino group, the group of the general formula

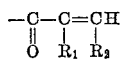

(II)

in which $R_1$ stands for a chlorine atom and $R_2$ for a hydrogen atom or $R_1$ for a hydrogen atom and $R_2$ for a chlorine atom. The latter dyestuffs, i.e., those wherein $R_1$ is a hydrogen atom and $R_2$ a chlorine atom, are of particular technical interest, since by reason of their low fixation temperatures they lend themselves admirably for the continuous dyeing of textile materials of native and/or regenerated cellulose.

We claim:

1. A water-soluble monoazo dyestuff consisting of a benzene diazo component coupled by way of an azo group with a coupling component selected from the group consisting of the benzene, naphthalene and pyrazolone series, said coupling component having at least one sulfonic acid substituent in an aromatic ring and said benzene diazo component being free from sulfonic acid groups but containing a reactive substituent selected from the group consisting of

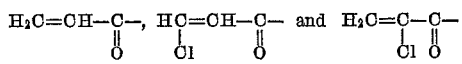

combined by way of a bridge member selected from the group consisting of

and

wherein the imino nitrogen atom is linked to said reactive substituent, the bridge member —NH— being connected to the benzene diazo component in one of the positions meta and para with respect to the azo group and the bridge member —NH—CH$_2$— being connected to the benzene diazo component in para position with respect to the azo group.

2. The dyestuff of the formula:

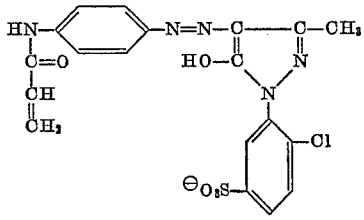

3. The dyestuff of the formula:

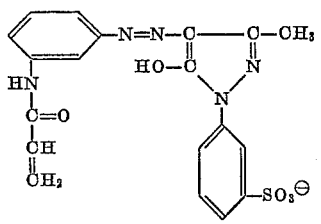

4. The dyestuff of the formula:

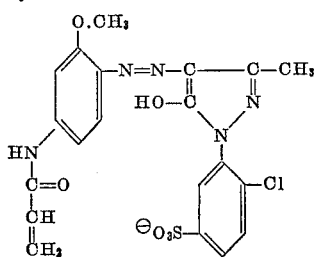

5. The dyestuff of the formula:

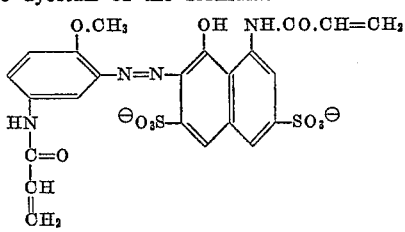

6. The dyestuff of the formula:

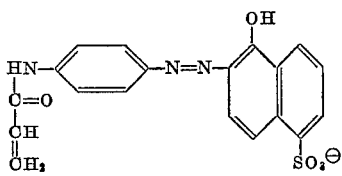

7. The dyestuff of the formula:

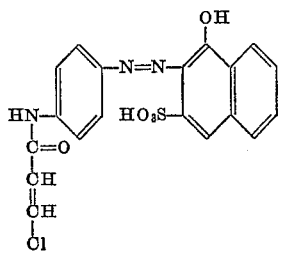

8. The dyestuff of the formula:

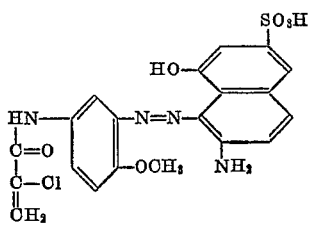

References Cited in the file of this patent

UNITED STATES PATENTS

| | | |
|---|---|---|
| 2,274,717 | Lyford | Mar. 3, 1942 |
| 2,398,367 | Felix et al. | Apr. 16, 1946 |
| 2,402,538 | Dreyfus | June 25, 1946 |
| 2,657,205 | Heyna et al. | Oct. 27, 1953 |
| 2,720,517 | Kartaschoff et al. | Oct. 11, 1955 |
| 2,743,267 | Heyna et al. | Apr. 24, 1956 |